Sept. 8, 1970 H. BRECHNA ET AL 3,527,873

COMPOSITE SUPERCONDUCTING CABLE HAVING A POROUS MATRIX

Filed Dec. 27, 1968

INVENTORS
HABIBO BRECHNA
EDWARD L. GARWIN
BY
ATTORNEY

United States Patent Office
3,527,873
Patented Sept. 8, 1970

3,527,873
COMPOSITE SUPERCONDUCTING CABLE HAVING A POROUS MATRIX

Habibo Brechna, Palo Alto, and Edward L. Garwin, Los Altos Hills, Calif., assignors to the United States of America as represented by the United States Atomic Energy Commission Filed Dec. 27, 1968, Ser. No. 787,419
Int. Cl. H01b 7/34
U.S. Cl. 174—15 10 Claims

ABSTRACT OF THE DISCLOSURE

A composite superconducting cable comprised of a circular array of solid strands of superconducting wire embedded in a porous matrix that supports the strands within a solid conduit. The matrix is provided with a central passage through which supercritical or superfluid helium is circulated as a coolant; the matrix is further provided with small longitudinal channels formed in its periphery adjacent the conduit for venting gaseous helium to a low-pressure reservoir.

BACKGROUND OF THE INVENTION

The present invention relates to composite superconducting cables, and more particularly, the invention pertains to a composite superconducting cable comprised of a superconducting wire embedded in a porous matrix that supports the wire in a conduit through which a coolant is circulated.

The phenomenon of superconductivity, i.e., zero electrical resistance, is produced by cooling a superconducting alloy, such as niobium tin or niobium titanium, below a critical temperature. For the most common superconducting alloys the critical temperature is 18° K. or less and may be achieved with a liquid cryogen coolant, such as liquid helium which has a temperature of 4.2° K. under standard atmospheric conditions. However, the actual operating temperature of a particular superconductor is influenced by several factors including the amount of current flowing in the conductor, the size and rate of change of any magnetic fields to which the conductor is subjected, and the rate at which the conductor can be cooled. In particular, current conduction above a critical level causes a temperature rise in the conductor that results in a partial loss of zero resistance which produces localized heating. Since the normal resistance of superconductors is relatively high compared to copper or aluminum at cryogenic temperatures, any rise in the temperature of the conductor above the critical temperature level causes local heating which may result in heating of adjacent areas and eventually the entire conductor. When this happens, the superconductor reverts from zero resistivity to its normal resistance, causing Joule heating in the conductor. Due to the high normal resistance of superconducting alloys, the temperature may be so high as to destroy the conductor. To protect superconducting wire against such reversion and possible destruction, the wire may be provided with a jacket of normal metal of high electrical conductivity such as silver, copper or aluminum, resulting in a composite superconducting cable. In the event of local heating, the superconducting current is carried temporarily in the jacket adjacent the heated section of superconductor until the section is cooled below its critical temperature, thereby restoring its superconductivity. Under these conditions, the current may be temporarily reduced below a "recovery level" that will permit superconductivity to be restored. A cable constructed to operate in this manner is regarded as stable and can stably carry high transport currents. However, to obtain a high level of stability, the cross-sectional area of normal metal used in conjunction with the superconductor is often in excess of ten times the amount of the superconductor. In addition, coolant passages, insulation, and reinforcements result in low ratios of superconducting to non-superconducting materials, i.e., low space factors that are commonly in the range of 5% to 15%. This means that only 5% to 15% of the total area of such a composite cable is occupied by a superconductor, resulting in an overall current density much less than the density ordinarily attained with short lengths of bare superconducting wire immersed in a cryogen.

Thus there are several persistent and interrelated problems in the design and development of superconducting cables: one is to stabilize a superconducting cable for conduction of a continuous high current; another is to produce a cable having a high rate of heat transfer to a coolant; another is to design a cable having a high space factor; and another is to provide a superconducting cable that can be used to wind superconducting solenoids that do not require immersion in a cryogen.

SUMMARY OF THE INVENTION

In brief, the present invention pertains to a composite superconducting cable comprised of superconducting wire supported within a conduit by means of a porous matrix that is provided with a main channel for circulation of a coolant through the cable. The porous matrix provides a convenient support for the superconducting wire within the conduit, and at the same time, the porosity of the matrix allows the penetration of coolant directly to the wire. The conduit may be selected to be flexible and impervious to the coolant and thus may be used for constructing superconducting solenoids that are similar to conventional solenoids and do not require immersion in a cryogen. Furthermore, a cryogen in a supercritical state is easily circulated through the cable and, because of the porous matrix, the coolant penetrates directly to the superconducting wires. High heat flux due to local heating are thereby rapidly absorbed and carried away by the circulating coolant. Moreover, channels can be provided in the periphery of the cable inside the conduit to aid circulation of gas that is generated adjacent the parts of the composite cable that may be heated due to a flux disturbance. In addition, the invention results in a superconducting cable that has a high space factor and is also stabilized. Stabilization is normally accomplished by surrounding superconducting wires with solid normal metal of high electrical conductivity. However, at cryogenic temperatures, for example, liquid helium at 4.2° K., the commonly used normal metals, such as copper or aluminum, have very low heat capacity and are not efficient in maintaining low temperatures at the superconductor when local transient heating occurs. By using a porous matrix to support superconductors within a conduit, a relatively large volume of space is provided for circulation of a coolant which has a high heat capacity, supercritical helium, for example. In such an arrangement, the ratio of non-superconducting material to superconducting material can be substantially reduced over conventional superconducting cables with a consequent reduction in the overall cross-sectional area of the cable without jeopardizing stability of the cable. A cable with a porous matrix therefore has a high space factor and can be operated at high current densities. These features make the construction of superconducting devices including both AC and DC transmission lines, magnets and electrical machines more attractive economically.

It is an object of the invention to provide a superconducting cable that has a high space factor, that is stabilized, and that has a high heat capacity.

Another object is to provide superconducting cable for making superconducting solenoids that do not need to be immersed in a cryogen.

Another object is to support superconducting wire in a conduit by means of a porous matrix.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
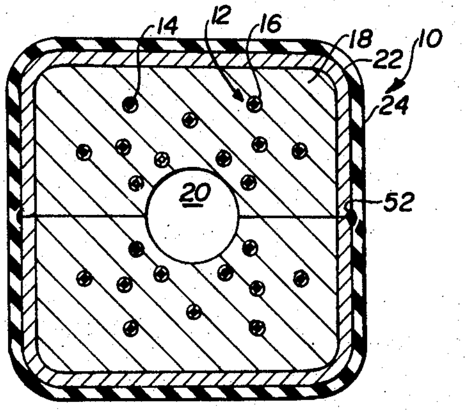
FIG. 1 is a cross-sectional diagram of a composite superconducting cable comprised of a plurality of strands of solid superconducting wire coated with normal metal and embedded in a porous matrix having a central passage for circulation of a coolant, according to the invention.

Referring to the drawing, there is shown in FIG. 1 a composite superconducting cable 10 comprised of solid strands 12 that are composed of a central solid superconducting wire 14 coated with a solid substrate of normal electrical conductor 16 for partially stabilizing the wire 14. The plurality of strands 12 are embedded in a porous matrix 18. The matrix may be constructed of various organic or inorganic materials, such as an epoxy resin or a heat-bonded metal powder, which are porous, flexible, will not deteriorate because of exposure to a cryogen and have low melting points relative to the annealing temperature of the superconducting wire to be used. A central passage 20 is formed throughout the length of the cable 10 for circulation of a liquid coolant therethrough that will penetrate the matrix 18 for direct contact with the strands 12. The matrix 18 is enclosed in a conduit 22 that is impervious to the coolant and that can withstand the magneto-mechanical forces and the coolant pressure. The conduit 22 may conveniently be covered with an electrical insulation 24 for electrical isolation of the cable 10; the conduit also acts as a general strengthening element for the cable.

Figure 2:
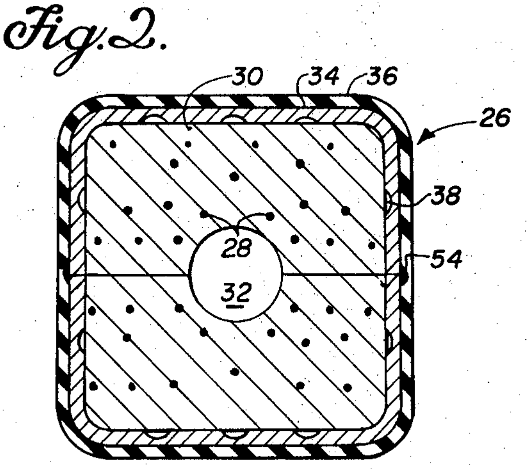
FIG. 2 is a cross-sectional diagram of a composite superconducting cable comprised of solid superconducting wires embedded in a porous matrix and provided with a central cooling passage similar to the cable of FIG. 1, and further provided with low pressure vent channels for exhausting high-pressure gaseous coolant.

Referring to FIG. 2 of the drawing there is shown a second composite superconducting cable 26 similar to that shown in FIG. 1 and comprised of strands 28 of solid superconducting wire embedded in a porous matrix 30 having a central passage 32 for circulation of coolant. The matrix is enclosed in a conduit 34 which is wrapped with electrical insulation 36. In addition, however, the conduit 34 is formed to have vent channels 38 in its inner periphery for venting gaseous helium to a low-pressure reservoir.

Use of a supercritical cryogen as a coolant, such as supercritical helium, gives outstanding results because of the inherently high heat transfer characteristics of a cryogen in a supercritical state. Better heat transfer is obtained because a supercritical cryogen has only a single state and therefore is in constant and uniform contact with all of the heat transfer surfaces of the matrix and superconducting strands, regardless of localized heating. The constant and uniform contact of the cryogen with the heat transfer surfaces tends to immediately limit any localized heating and therefore permits operation of the cable to the limit of the superconductor critical current.

Figure 3:
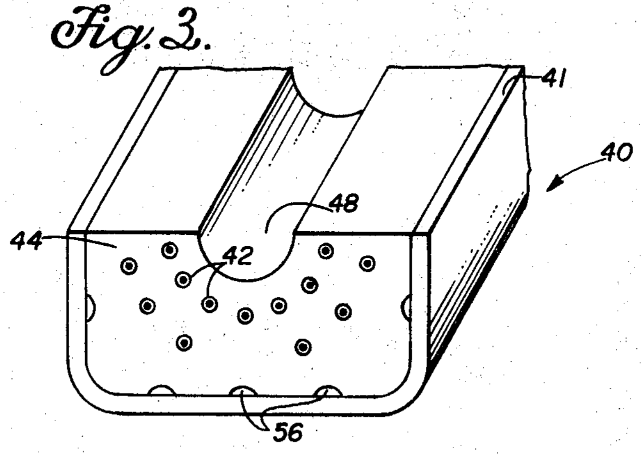
FIG. 3 is an isometric view of a section of a superconducting cable in an intermediate state of construction which illustrates one method of constructing the superconducting cables of FIGS. 1 and 2.

Referring to FIG. 3 there is shown a section of superconducting cable 40 in an intermediate state of construction which illustrates one method of manufacturing the superconducting cables 10 and 26 of FIGS. 1 and 2, respectively. The section 40 is comprised of a U-shaped conduit 41 in which superconducting strands 42 having jackets of a normal metal are packed with a powder 44 of normal metal. The entire section 40 is then heated to a temperature less than the annealing temperature of the superconductor, but high enough to create strong bonds between the metal particles 44, between the particles and the jackets 16 of the superconducting wires 12, and between the particles and the conduit 41. This results in a cohesive half of a superconducting cable that may be formed into a complete cable by mating it with a similar half and then brazing or welding the two halves together where the conduits meet, such as with a bead 52 and a bead 54 of the cables 10 and 26 respectively.

Preferably, the powder used for the matrix should have a melting point substantially below the temperature at which the superconducting properties of the superconducting strands is degraded; for example, cadmium powder has a melting point of approximately 140° C. and is suitable as the matrix when used in conjunction with niobium-tin superconducting strands which are not degraded at temperatures less than 300–350° C.

While a embodiment of the invention has been shown and described, further embodiments or combinations of those described herein will be apparent to those skilled in the art without departing from the spirit of the invention or from the scope of the appended claims.

We claim:

1. A composite superconducting cable comprising a superconducting wire, a conduit, and a porous matrix supporting said wire within said conduit, said matrix being formed to have a main cooling passage for circulation of a coolant, said matrix defining a multitude of minute interconnected interstices for circulation of the coolant from said main passage through said interstices directly to said wire.

2. The superconducting cable of claim 1 wherein said porous matrix is a porous cohesive mass bonded to said wire and to said conduit.

3. The superconducting cable of claim 1 wherein said wire includes a thin jacket of normal metal surrounding said superconducing wire.

4. The superconducing cable of claim 3 wherein said porous matrix is a porous cohesive mass formed by heating a powdered metal that is bonded during the heating to said jacket and to said conduit.

5. The superconducing cable of claim 1 wherein said porous matrix is a cohesive porous mass formed by heating powdered cadmium.

6. The superconducting cable of claim 1 wherein said matrix is an epoxy resin.

7. The superconducting cable of claim 1 wherein said matrix is formed to have a central passage as the main cooling passage, and further including a plurality of superconducting wires embedded in said matrix around said central passage.

8. The superconducing cable of claim 7 wherein supercritical helium is circulated as a coolant through said central passage and the interstices of said porous matrix.

9. The superconducting cable of claim 7 wherein said conduit is comprised of two joined halves each filled with a cohesive porous matrix material formed by heating a powdered metal in which said plurality of superconducting wires are embedded.

10. The superconducting cable of claim 7 further including a plurality of channels formed at the periphery of said matrix to aid circulation of said coolant.

References Cited

UNITED STATES PATENTS

| | | | |
|---|---|---|---|
| 3,306,972 | 2/1967 | Laverick et al. | 335—216 X |
| 3,472,944 | 10/1969 | Morton et al. | 174—15 |

LEWIS H. MYERS, Primary Examiner

A. T. GRIMLEY, Assistant Examiner

U.S. Cl. X.R.

174—126; 335—216